United States Patent

[11] 3,595,502

[72] Inventor: Leslie C. Galloway, Burlington, Ontario, Canada
[21] Appl. No.: 832,638
[22] Filed: June 12, 1969
[45] Patented: July 27, 1971
[73] Assignee: Canadian Westinghouse Company Limited, Hamilton, Ontario, Canada

[54] COUPLING ASSEMBLY FOR BEDPLATE AND SUPPORTING STRUCTURE
6 Claims, 3 Drawing Figs.

[52] U.S. Cl. ................................................. 248/13, 287/1, 308/2
[51] Int. Cl. .......................................... F16m 5/00, F16m 7/00
[50] Field of Search ........................................... 248/2, 13, 19, 54, 55; 14/16; 52/167, 573; 308/2

[56] References Cited
UNITED STATES PATENTS
| | | | |
|---|---|---|---|
| 981,884 | 1/1911 | Ruhl | 52/167 |
| 2,092,180 | 9/1937 | Porter | 308/2 X |
| 2,208,872 | 7/1940 | Ropp | 52/167 |

FOREIGN PATENTS
| | | | |
|---|---|---|---|
| 927,012 | 5/1963 | Great Britain | 248/13 |

Primary Examiner—William H. Schultz
Attorney—R. H. Fox

ABSTRACT: This invention relates to a method of coupling and supporting a rigid bedplate and a supporting structure. The bedplate is supported on a roller assembly on a structural member which is able to twist about an axis perpendicular to the axis of the roller in the roller assembly and thus minimize transmission of deforming stresses to the bedplate.

PATENTED JUL 27 1971
3,595,502
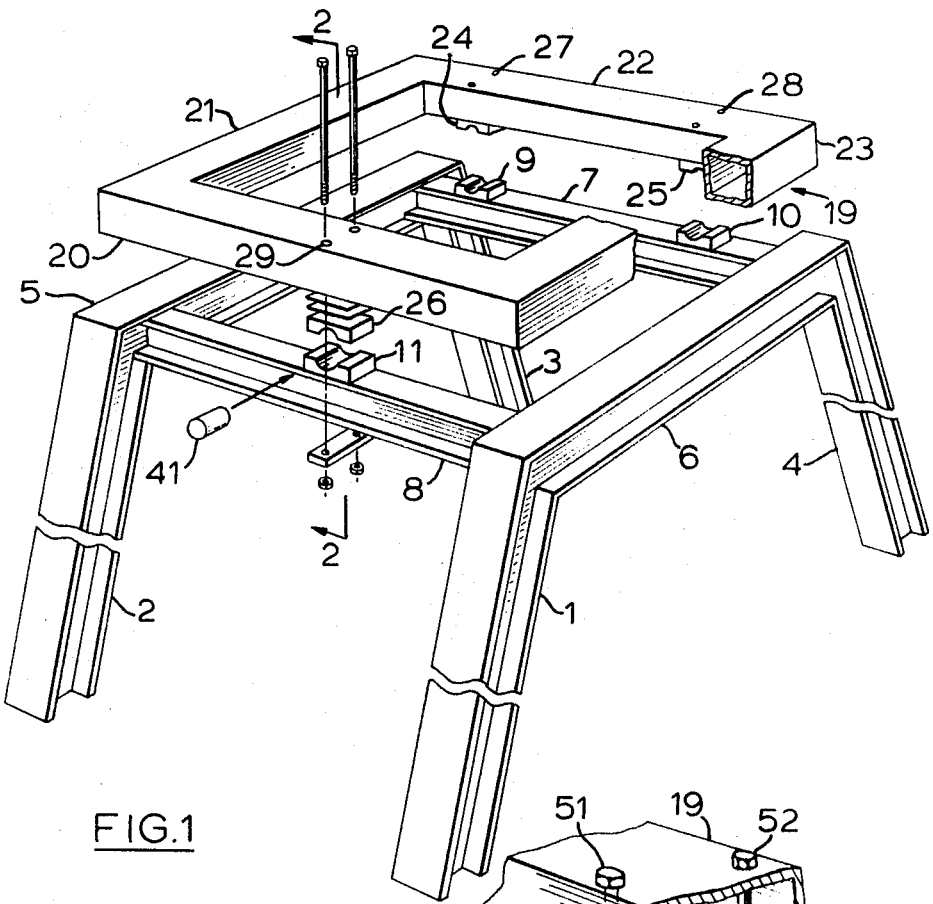
FIG.1
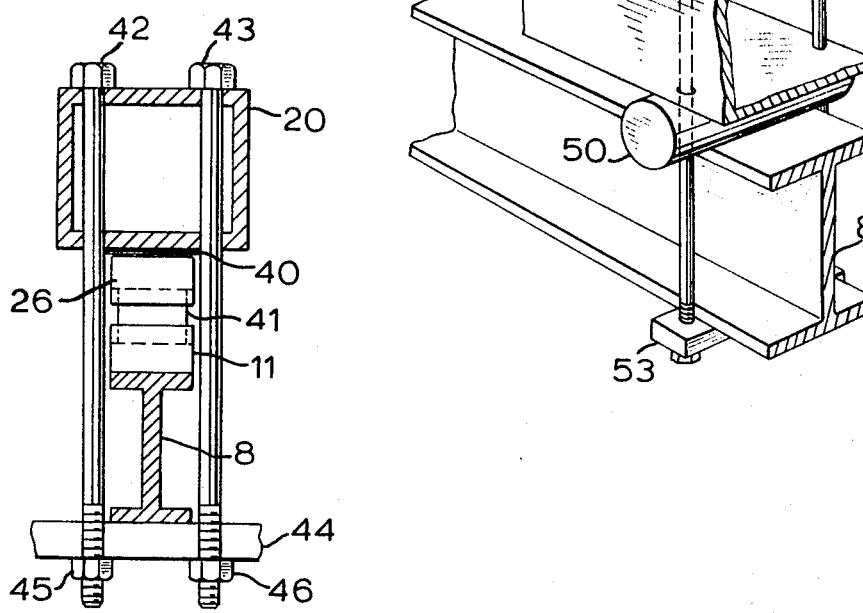
FIG.2
FIG.3

COUPLING ASSEMBLY FOR BEDPLATE AND SUPPORTING STRUCTURE

Generally in the past, in installations of the type which necessitated that large massive machinery be supported in a particular location, an appropriate bedplate was provided and the machinery was attached to the bedplate which was in turn rigidly secured to its supporting structure. If deformation of the bedplate was to be avoided or controlled within specified tolerances, it was necessary that the supporting structure be very rigid, and the foundations of the supporting structure were made as stable as possible. If, perchance, the supporting structure was subjected to a severe amount of shifting, such as might occur by subsidence of the material beneath and around the foundations of the supporting structure, the bedplate would be forced to deform, resulting in possible misalignment of the machinery which was attached to the deformed bedplate. The distortion with which this application is concerned, is a distortion of the bedplate from a plane surface.

Partial solution to the problem of preventing deformation of a bedplate in the past was achieved by supporting the bedplate at only three points. This assured that the bedplate itself would remain in a plane, but because the weight of the heavy machinery demanded that the supporting structure be somewhat unyielding, the supporting devices in the past have been of such nature and design as to transmit the angular distortion of the supporting structure into the bedplate itself when uneven settling of the foundation occurred. This problem may be overcome by the use of spherical supports (ball and socket assemblies) between the supporting structure and the bedplate, but these devices are usually expensive and have relative structural weaknesses which have prevented universal acceptance.

This invention provides a solution to the above problem through the provision of a special coupling technique to be applied between the supporting structure and the bedplate which will allow freedom of rotation about two dissimilar axes (preferably orthogonal) in order to prevent the transmission of stresses into the bedplate. It will become apparent that by the careful selection of the supporting structure, one of the above axes of freedom of rotation will be found to exist already in the support members. The envisaged structure comprises beams which support the bedplate, and these beams are chosen to be able to twist with relative ease about their longitudinal axes. This is particularly true when the usual wide channel I-beams are selected to be used for this purpose.

The coupling members which are the subject of this invention are composed of a roller separating the beams and the bedplate and, preferably, a pair of bearing blocks, each block having a recess in one face of the block, and when mounted, the pair of bearing blocks are arranged so that the recesses face one another. One bearing block is suitably secured to the bedplate, and the other is suitably attached to the horizontal supporting structure. The roller is placed in the recess formed by the two bearing blocks, and in any event, the axis of the roller is dissimilar (preferably orthogonal) to that of the beam. A pair of bolts are used to secure the bedplate to the horizontal supporting structure at each coupling in such a manner as to allow the coupling members substantial freedom to pivot about the encased roller, particularly by having the axes of the bolts intersect the axis of the roller.

A better understanding of the invention may be gained from the following explanation which is best illustrated by the accompanying drawings, in which:

FIG. 1 is a projection of a typical supporting structure and the associated bedplate which is to be supported some distance above ground level on the supporting structure.

FIG. 2 is an elevation sectional view of the fastening device used to couple the bedplate and the supporting structure together.

FIG. 3 shows an alternate method of coupling the bedplate and supporting structure.

Referring now to FIG. 1, it is seen that four I-beam members number 1, 2, 3 and 4 are shown embedded in the ground in some suitable foundation to form the main vertical support for the horizontal members of the structure. Horizontal members 5 and 6 are welded, riveted, bolted or otherwise joined to members 1, 2, 3 and 4 to form part of the horizontal supporting structure which is to be located some distance above the ground. Also riveted, bolted or otherwise joined to members 5 and 6 are a pair of crossmembers 7 and 8. It is noted that all the members making up the supporting structure are shown as wide-channel I-beam members. It is not absolutely necessary that the members making up the supporting structure be of this configuration as long as beams 7 and 8 be constructed of members which will permit a certain amount of torsional twisting about their longitudinal axes. Mounted on member 7 are a pair of bearing blocks 9 and 10. Blocks 9 and 10 are formed from steel or some other suitable bearing material, and it is noted that each block has a recess which may be semicylindrical in shape in the top of the block. Mounted on member 8 is a similar block 11, having a recess in the top surface of the block 11.

A bedplate assembly 19 is also shown composed typically of four members 20, 21, 22 and 23 of rectangular cross section welded together to form a unitary supporting structure. It is imperative that the members 20, 21, 22 and 23 be made of such material and of such cross section, and be joined together in such a manner as to form as rigid a unit as is practically possible. Mounted on the lower side of bedplate 19 are three bearing blocks 24, 25 and 26. Members 24, 25 and 26 are complementary to members 9, 10 and 11, and the members 24, 25 and 26 are of the same shape and configuration as those on the supporting structure. Members 24, 25 and 26 may be located on structure 19 by means of dowels or any other similar suitable locating members.

It will probably be necessary to have provision for the insertion of shims between the members 24, 25 and 26 and the bedplate in order to facilitate the adjustment of the bedplate to the proper level. It will also be noted that there appears a series of pairs of holes shown as 27, 28 and 29 in the top surface of the bedplate 19. Similar holes will also be found in the lower surface of the boxlike structure opposite the holes illustrated as 27, 28 and 29, and the holes in the lower surface will straddle the blocks 24, 25 and 26. A further explanation of the location of the holes 27, 28 and 29 as well as the location with respect to the blocks 24, 25 and 26 will follow in FIG. 2.

Machinery of a nature which must be kept in proper alignment may be attached in any suitable manner to the structure 10.

Referring now to FIG. 2 which illustrates the manner in which the coupling member is inserted between the supporting member 8 and the bedplate 20, it will be seen that a bearing block 26 is shown mounted in abutting relationship with member 20. Provision is made for the insertion of shims 40 between the member 26 and the member 20 which may be necessary for levelling purposes. A bearing block 11 is shown having a semicylindrical recess facing the bearing block 26. Bearing block 11 is mounted on the I-beam structure member 8 to complete the assembly. A roller 41 is shown located in the semicylindrical recesses in blocks 26 and 11. A pair of bolts 42 and 43 are passed through the bedplate 19 to straddle the bearing blocks 26 and 11 and the I-beam 8, through yoke member illustrated as 44 into a pair of nuts 45 and 46 respectively. It is envisaged that the volts 42 and 43 will pass through the longitudinal axis of roller 41. Nuts 42 and 43 are tightened to hold the assembly in place.

It is also expected that the bearing blocks 26 and 11 will be located permanently by some method of attachment with respect to members 20 and 8. The method of attachment will probably be the form of dowels or some other suitable locating means.

FIG. 3 shows an alternate form of the invention in an instance where a simpler coupling is acceptable.

In this instance, a roller 50 separates the beam 8 from the bedplate 19. Roller 50 is made any desirable diameter and two holes are drilled through the roller 50 for the insertion of bolts 51 and 52. The holes in roller 50 must be of sufficient size to provide adequate clearance for bolts 51 and 52 to permit the required torsional twisting about the longitudinal axis of roller 50.

Finally bolts 51 and 52 are passed through yoke 53 and the assembly of bedplate 19 and support member 8 are coupled together.

When this method of coupling is examined, it will be seen from FIG. 2 that the bearing block structure provides adequate freedom for torsional twisting of member 20 about roller 41 in cases where the foundation shifts to cause such rotation, thus it is expected that the rigid bedplate assembly will not deform to any great extend when member 8 is shifted in an instance where the subsidence of the material holding the foundation in place causes member 8 to twist. Perhaps the other notable feature of this invention arises from the fact that the members which are chosen for this construction, and which have been typically illustrated as wide-channel I-beams are necessarily relatively flexible in torsional twisting about their longitudinal axes. For this reason, it is quite possible to achieve torsional twisting of I-beams 7 and 8 about their longitudinal axes in order to accommodate various forms of shifting of the foundation structure.

Referring again to FIG. 1, if for instance, leg 3 of the supporting structure were allowed to settle somewhat, it is quite conceivable that bearing block 9 may drop by some small amount, and because the bedplate is rigid, there must be some torsional twisting of bearing block 26 about the roller between itself and block 11, but at the same time, bearing block 11 must be twisted about the longitudinal axis of I-beam 8. The same principle applies to the blocks 9 and 10, which are mounted on wide-channel I-beam 7.

It will be noted that it is not necessary that the machinery which is to be supported be elevated as shown in FIG. 1 because this method of support may be applied in any instance where it is required that a bedplate support heavy machinery and yet remain substantially undistorted. The main requirement is that the members to which the coupling members are to be applied which support the bedplate and which have been illustrated as members 7 and 8 in this disclosure, must be attached to the foundation in some suitable manner so as to permit a degree of torsional twisting about their longitudinal axes. It will be noted that common wide-channel I-beams have been used for illustrative purposes throughout the disclosure, but this, of course, is not meant to be restrictive in nature. Any beams which will provide ample physical load-carrying capacity and yet permit a degree of torsional twisting about its longitudinal axis will suffice for purposes of this disclosure.

Other variations of the invention are possible, such as the use of a V-shaped recess in the coupling members instead of a semicylindrical recess illustrated.

It may also occur that in some instances, it may be necessary to provide a captive-type mounting for roller 41. In this instance, it is quite possible to make provisions in the bearing block so that roller 41 may be contained in the recess of the blocks in order that roller 41 may be restrained from moving along its longitudinal axis. It is believed that improvements such as these are quite obvious alternatives, and do not change the basic concept of this invention.

The embodiments of the invention in which I claim an exclusive property or privilege are defined as follows:

1. A coupling assembly for coupling a first member to a supporting structure comprising:
   a. a second member comprising an I-beam fastened to said supporting structure at its ends so as to resistively permit a predetermined amount of torsional twisting about a longitudinal axis of said second member,
   b. a coupling means comprising at least a roller attached between said first and second member so that said coupling means permits a relatively large amount of torsional twisting about an axis perpendicular to the longitudinal axis of said second member, and
   c. restraining means comprising a pair of bolts serving to stress said roller between said first and second member and to prevent any substantial rectilinear motion between said first and second members.

2. A coupling assembly for coupling a first member to a supporting structure comprising:
   a. a second member being of generally elongated shape fastened to said supporting structure at its ends so as to resistively permit a predetermined amount of torsional twisting about a longitudinal axis of said second member,
   b. a coupling means attached between said first and second member so that said coupling means permits a relatively large amount of torsional twisting about an axis perpendicular to the longitudinal axis of said second member, and
   c. restraining means to prevent any substantial rectilinear motion between said first and second members,
   said coupling means comprising a pair of bearing blocks, each block of said pair having a recess formed in one surface thereof, one block of said pair being mounted on said first member and the other block of said pair mounted on said second member, the blocks mounted on said members in such a manner that the respective recesses face one another, and are suitably located to receive a cylindrical member therebetween, said restraining means causing said first and second members to apply compressive stress to said cylindrical member through said bearing blocks while permitting said first member to rotate a predetermined amount about said cylindrical member.

3. A coupling assembly for coupling a first member to a supporting structure comprising:
   a. a second member being of generally elongated shape fastened to said supporting structure at its ends so as to resistively permit a predetermined amount of torsional twisting about a longitudinal axis of said second member,
   b. a coupling means attached between said first and second member so that said coupling means permits a relatively large amount of torsional twisting about an axis perpendicular to the longitudinal axis of said second member, and
   c. restraining means to prevent any substantial rectilinear motion between said first and second members,
   said coupling means comprising a pair of bearing blocks, each block of said pair having a cylindraceous recess, one of said bearing blocks being attached to said first member, the other of said bearing blocks being attached to said second member, so that the cylindraceous recesses face one another, and form a receptacle for a cylindrical member of slightly less radial curvature than the radial curvature of said cylindraceous recesses, and said restraining means comprises bolt means for bolting said first and second members together so as to exert a compressive stress on said cylindrical member, said bolt means arranged to be perpendicular to the longitudinal axis of said cylindrical member and intersect the axis of said cylindrical member.

4. A coupling assembly for coupling a first member to a supporting structure comprising:
   a. a second member being of generally elongated shape fastened to said supporting structure at its ends so as to resistively permit a predetermined amount of torsional twisting about a longitudinal axis of said second member,
   b. a coupling means attached between said first and second member so that said coupling means permits a relatively large amount of torsional twisting about an axis perpendicular to the longitudinal axis of said second member, and
   c. restraining means to prevent any substantial rectilinear motion between said first and second members,
   said second member comprising an I-beam and the coupling means comprising at least a roller encased in a pair of bearing blocks, said coupling means being located between said first and second members so that the axis of the roller is orthogonal to the longitudinal axis of said second member, said restraining means comprising a pair of bolts connecting said first and second members in such a manner as to cause compressive stress on said roller, said bolts being located so as to pass through the axis of said roller.

5. A coupling assembly as claimed in claim 1 wherein said bolts pass through the longitudinal axis of the roller.

6. A coupling means as claimed in claim 2 wherein said second member is an I-beam and said restraining means comprises a pair of bolts, the axes of which pass through the longitudinal axis of said cylindrical member.